(12) United States Patent
Hansen, III et al.

(10) Patent No.: US 6,240,948 B1
(45) Date of Patent: Jun. 5, 2001

(54) RUPTURE DISK ASSEMBLY

(75) Inventors: Charles C. Hansen, III, Hinsdale; John A. Yencho, Elmhurst; Orval J. Kuhn, Jr., Warrenville, all of IL (US)

(73) Assignee: Hansen Technologies Corporation, Burr Ridge, IL (US)

( * ) Notice: Subject to any disclaimer, the term of this patent is extended or adjusted under 35 U.S.C. 154(b) by 0 days.

(21) Appl. No.: 09/471,780

(22) Filed: Dec. 23, 1999

Related U.S. Application Data

(60) Provisional application No. 60/114,920, filed on Jan. 5, 1999.

(51) Int. Cl.[7] ............................................. F16K 17/16
(52) U.S. Cl. ........................... 137/68.28; 137/68.19; 137/68.23; 137/68.26; 220/89.2
(58) Field of Search ......................... 137/68.19, 68.21, 137/68.22, 68.23, 68.24, 68.25, 68.26, 68.27, 68.28, 68.29, 68.3; 220/89.2

(56) References Cited

U.S. PATENT DOCUMENTS

| | | |
|---|---|---|
| 3,658,206 * | 4/1972 | Barbier ............................... 220/89 A |
| 3,845,879 | 11/1974 | Dernbach et al. . |
| 3,901,259 * | 8/1975 | Banbury ................................. 137/68 |
| 4,431,018 | 2/1984 | Finnegan . |
| 4,479,603 | 10/1984 | Finnegan . |
| 4,580,589 | 4/1986 | LeBras et al. . |
| 4,682,619 | 7/1987 | Clift et al. . |
| 4,830,052 | 5/1989 | Oberlin et al. . |

* cited by examiner

*Primary Examiner*—John Rivell
*Assistant Examiner*—Ramesh Krishnamurthy
(74) *Attorney, Agent, or Firm*—Gardner Carton & Douglas

(57) ABSTRACT

A rupture disk which is welded or brazed to a relatively massive or robust ring member integrally attached to the remainder of the body by an isolating member of reduced cross-sectional thickness. The upper part of the tubular body is attached by welding or brazing to the lower half of the body at a flange which extends outwardly from the mounting member. This eliminates the need for compressive forces to effect a seal, and one or two sources of potential leakage and setpoint shift (assembly force) are thereby eliminated.

9 Claims, 2 Drawing Sheets

RUPTURE DISK ASSEMBLY

This application is a non-provisional application claiming priority of provisional Application Ser. No. 60/114,920, filed Jan. 5, 1999.

BACKGROUND OF THE INVENTION

This invention relates generally to improvements in rupture disk pressure relief devices of the type which when activated must contain the discharge within a discharge piping system. In addition, the invention pertains to novel methods of manufacturing rupture disks to achieve reliability and predictability in the finished product. In particular, the improvements address and favorably resolve the tendency for these types of devices to leak or change setpoint due to stresses imposed upon them during installation and service. In addition, by reason of the use of a novel method of heat sinking during welding or brazing the components together, the rupture disk assemblies avoid all internal thermal stresses arising from welding or brazing.

Rupture disks devices are non-reclosing pressure relief devices intended to prevent catastrophic overpressure inside of a pressure vessel, and safely channel any discharge within a discharge piping system. They typically comprise a two-piece tubular body sealed against internal flow by a disk, usually convex when viewed from the high pressure side, designed to rupture at a predetermined pressure. The bodies are designed to connect to a discharge piping system. The piping system is designed to transport the highly pressurized product, either liquid or gas, to a protected vessel in a safe discharge location.

At levels below the safe working pressure of protected vessels, rupture disks are designed to remain sealed, allowing no leaks out of or through the discharge piping. If the pressure in the protected vessels reach a carefully predetermined point, the rupture disk devices are designed so as to rupture, allowing flow through the discharge piping, without allowing leakage to the outside of the piping.

In heretofore known rupture disk designs, the sealing of the disk, the sealing of the body from leaks outside the piping system, and the stability of the disk rupture pressure is at least to some degree affected by external forces on the rupture disk device.

In some designs the external forces are mechanical loads, particularly uneven loads, generated by bolts or threading required to assemble and seal the device. Careful control of assembly torque is required in order not to influence the sealing or burst point. Other rupture disk devices are affected by stresses induced by the discharge piping. The piping stress is transferred directly to the disk, and mounting of the disk affects both sealing and burst pressure. While these external forces are expected, they are in practice difficult to control or compensate for with exactitude. As a result, the sealing integrity and burst pressure integrity of previous designs are compromised by these external forces.

In view of the failure of the prior art to develop rupture disks which are characterized by having uniform release points free from stresses induced in them as a result of installation or thermal stress forces, it is an object of the invention to provide an improved body containing a rupture disk.

Another object of the invention to provide a rupture disk which is attached by welding or brazing an enlarged ring supported on a reduced thickness or isolation portion of the body.

Yet another object of the invention to provide an anchor point for the rupture disk which is a ring of relatively massive or robust cross-section compared to the thinned or reduced cross-section of the isolating ring.

Still another object of the invention to provide a rupture disk held on a robust ring which is in turn attached to the remainder of the body by thinned, serpentine ring or other member of reduced cross-section.

A further object of the invention is to provide a rupture disk having a two-piece body with the two pieces being joined by welding or brazing at the interface of an axial flange on one portion of the body and a radial flange on the other portion of the body.

A still further object of the invention is to provide a two-piece body wherein the lower piece contains a small rib or the like to ensure precise seating of the cap or upper portion of the body prior to welding.

An additional object of the invention is to provide one or more methods of heat sinking for use in preventing undue thermal stresses from penetrating into the robust ring or other member on which the rupture disk is seated from an isolating ring of reduced thickness during welding or brazing of one-half of the body to the other half of the body.

Another object of the invention is to provide an auxiliary method of cooling which includes blowing air, and particularly highly moistened air, over the areas which are needed to be kept cooled so as to prevent undue heat transfer during welding or brazing of the upper portion of the body to the lower portion of the body.

Yet another object of the invention is to provide separate heat sinking mechanisms for the upper and lower portions of the body, with or without additional cooling of the temporary portion inserted into the lower half of the body.

SUMMARY OF THE INVENTION

The invention lies in a rupture disk or like device wherein the disk is welded or brazed to a relatively massive or robust ring member integrally attached to the remainder of the body by an isolating member of reduced cross-sectional thickness. The upper part of the tubular body is attached by welding or brazing to lower half of the body at a flange which extends outwardly from the mounting member. This eliminates the need for compressive forces to effect a seal, and one or two sources of potential leakage and setpoint shift (assembly force) are thereby eliminated.

Moreover, the invention relates to preferred methods of making the rupture disk device, including brazing or welding the upper portion of the body to the lower portion. The method also includes the use of various kinds of heat sinks to avoid undue thermal transfer, and auxiliary heat reducing methods, in addition to the novel profiles of the supporting structure for the rupture disks themselves.

The manner in which the above and other objects and advantages of the invention are achieved in practice will become more clearly apparent when reference is made to the accompanying drawings, in which like reference numbers indicate corresponding parts throughout.

DESCRIPTION OF THE PREFERRED EMBODIMENTS OF THE INVENTION

Although the invention in practice may assume several different forms, and the embodiments may differ somewhat in detail from each other, several preferred embodiments are described herein in detail, as well as the method of making them.

Figure 1:
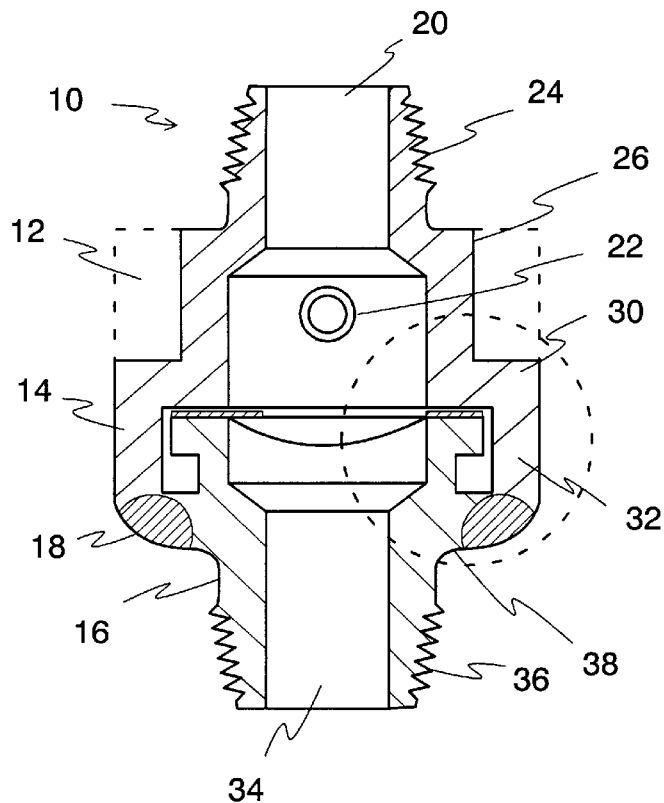
FIG. 1 is a vertical section view of one portion of the rupture disk of the invention, showing the rupture disk and details of its mounting structure, and showing upper and lower sections of the body joined to each other by welding.

Referring now to the drawings in greater detail, FIG. 1 shows a rupture disk type pressure relief assembly generally designated 10 to include a tubular body assembly generally designated 12. The body comprises an upper section 14 and a lower section 16, joined to each other by an hermetic, circumferentially continuous bead 18 of welding or brazing. The upper portion 14 includes a main outlet passage 20, and preferably a gauge port 22. The upper section of the body also includes a threaded portion 24, a first, short radial flange 26 lying between the threaded portion 24 and a smaller diameter axial flange 28, and a second enlarged diameter radial flange 30 in turn joined to an enlarged diameter axial flange 32.

Figure 2:
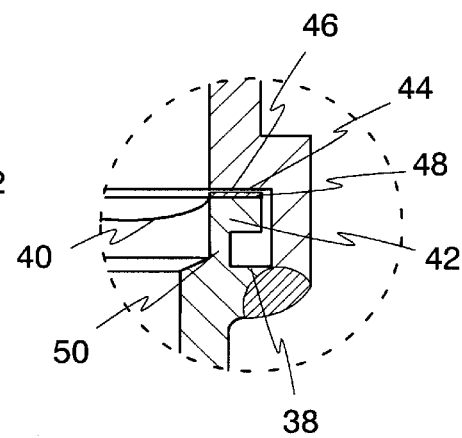
FIG. 2 is a greatly enlarged view of the welded or brazed joint between upper and lower body sections and also showing the rupture disk held in place by a washer which is welded thereto.

The lower body portion 16 includes a central or pressure passage generally designated 34 which is exposed to the pressure side of the vessel or other container protected by the rupture disk assembly 10. A threaded portion 36 extends upwardly and includes an offsetting radial flange 38 as best shown in FIG. 2. An important feature of the invention is that the rupture disk itself 40 sits atop an enlarged diameter relatively massive or robust mounting ring 42, where the outer margin 44 of the disk is sandwiched between the ring 42 and a relatively thick washer 46.

Preferably, the thin rupture disk 40 and the relatively thick washer 46 are secured to the robust mounting ring 42 by a circumferentially continuous bead 48 of welding or brazing. Also a very important feature of the invention is the reduced thickness of the ring isolating member 50 on which the mounting ring 42 is attached. The reduced cross-section or thinned ring isolating member 50 isolates or attenuates the undue mechanical or thermal strains arising throughout the body 12.

By having the rupture disk 40 fastened at the periphery of the mounting ring 42 and held in place by the thickened washer 46, there are no bolts creating fastening forces which occur at the upper face of the rupture disk. Therefore, any variability induced by wrenching or torquing the seal, or by having uneven torque levels on the mounting flanges, is eliminated and a much more consistent seal is formed.

The thinned ring isolating member 50 has a considerably thinner radial dimension than any of the relatively massive flanges 30, 32 or 38. Consequently, not only is little or no mechanical strain transmitted to the disk, but little or no thermal strains are likewise transmitted. This is because the heat arising from welding the bead 18 tends to flow principally to the more massive members 32, 38, and, to a lesser extent, to the flanges 16, 30.

Figure 3:
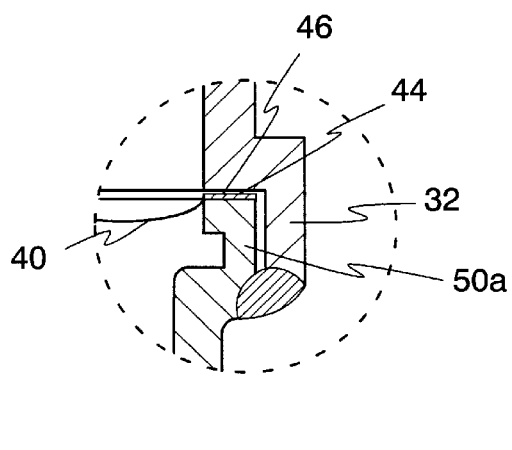
FIG. 3 is a vertical sectional view of a portion of another embodiment of the invention.

Referring now to FIG. 3, an alternate embodiment of the invention is shown. Here, most of the elements of the first embodiment are unchanged, but this embodiment differs in the location of the of the ring isolating member 50a. This ring isolating member here lies outboard of its location 50 in the embodiment of FIGS. 1 and 2. Accordingly, the diameter of the ring isolating member is slightly enlarged, whereas its thickness is normally the same or just thinner than that in the embodiment of FIGS. 1 and 2. Provided that the isolating member is not too close to the axial flange 32 of the body 12, this embodiment is satisfactory. However, it is not as preferred, since it may transfer slightly more heat, and thus be more likely to be used with the heat sinking to be referred to herein. The rupture disk 40, and the washer which fits on the top of it as well as the welding or brazing about the outer margin 44 of the rupture disk are the same as their counterparts in FIGS. 1 and 2.

Figure 4:
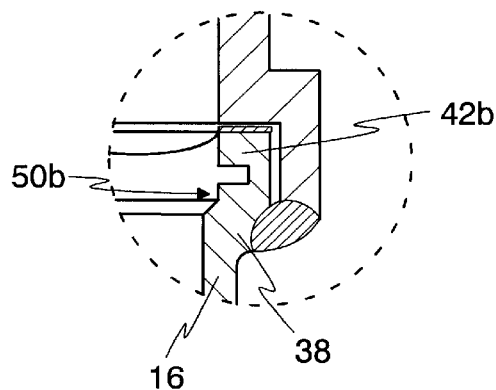
FIG. 4 is a vertical sectional view showing a portion of a still further embodiment of the invention.

Referring now to FIG. 4, a slight variation on the other two embodiments of the invention is shown. Here, the mounting ring 42b sits atop a convoluted thinned section or ring isolating member 50b. This ring isolating member 50b starts out being joined to the radial flange 38 of the lower portion 16 of the body. It then possesses an additional radial flange and another axial portion which is joined to the mounting ring 42b. This provides a more serpentine path and is somewhat less likely to transfer heat, or will transfer a reduced amount of heat, to the mounting ring 42b. Although slightly more difficult to manufacture, if the heat transfer is critical for any reason, the convoluted shape of the isolating member 50b may be preferred. Other shapes may be made in order to provide the mechanical and thermal isolation which is important to the invention.

Figure 5:
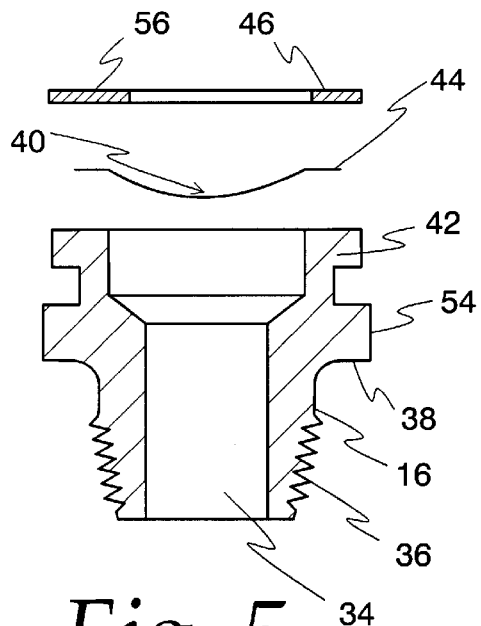
FIG. 5 is an exploded view showing the rupture disk, the mounting ring and the isolating ring as well as the lower portion of the body.

Referring now to the method of manufacturing the rupture disk assemblies 10 of the invention, FIG. 5 shows that the lower portion 16 of the body 12 is first constructed by placing the rupture disk 40 atop the mounting ring 42, with the domed portion 43 of the mounting ring being centered relative to the passage 34 in the lower body member 16. Once the rupture disk 40 is placed atop the mounting ring 42, the washer 46 is placed atop the disk 40 and the mounting ring 42.

Thereupon, a circumferentially continuous bead of welding or brazing is formed about the outer margin 44 of the rupture disk, securing it to the mounting ring 42. The washer 46 may be circumferentially continuous, or it may include a radially inward extension 56 which is sometimes useful in the case of failure of the rupture disk. The inward extension 56 thus engages a portion of the rupture disk, controlling the bending of the same as it breaks to provide the pressure relief necessary.

Referring again to FIG. 5, it will be noted that a very small rib 54 which may be circumferentially continuous is formed about the bottom portion of the radial flange 38 of the lower portion of the valve body 16. This ensures in practice, that the upper half 14 of the body 12 will be situated exactly before welding with respect to the bottom section 16 of the body. With the upper portion 14 of the body surmounting the lower portion 16 in the precisely desired relationship, the circumferentially continuous welded bead 18 is then laid down to secure the two sections of the body 14, 16 to each other, without movement of the body and without other engagements of the portions, particularly the ring isolating member 50 and the mounting ring 42, whose position is unchanged.

Figure 7:
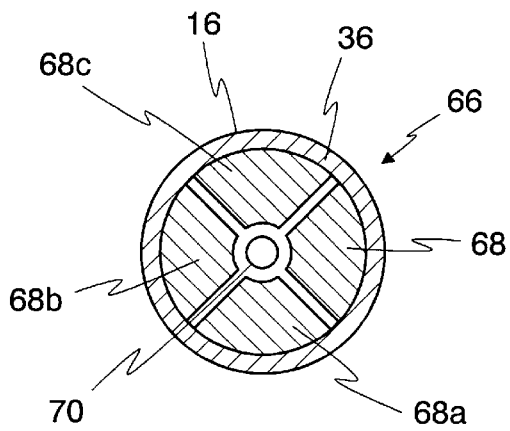
Figure 6:
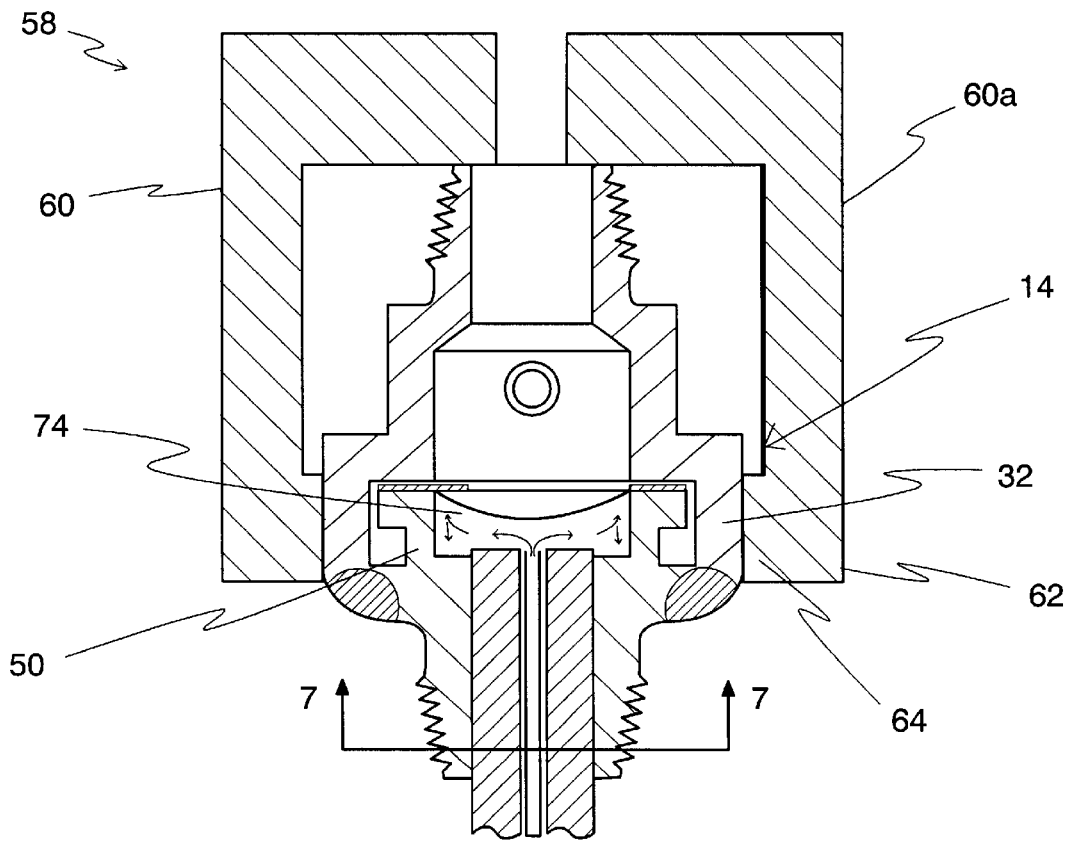
FIG. 6 is a vertical sectional view of a body of the rupture disk of the invention, showing the same with typical forms of upper and lower heat sinks in place; and, FIG. 7 is a bottom plan view, taken along lines 7—7 of FIG. 6 and showing the collet-type heat sink insert and the cooling tube in place within the lower portion of the body of the rupture disk of the invention.

Referring now to FIGS. 6 and 7, a preferred method of using one or more heat sinks in forming the rupture disk assembly of the invention is shown. Here, it is shown that the upper portion of the body 14 is surrounded by a massive copper heat sink generally designated 58, disposed in intimate heat exchange relation with the upper body, and particularly the axial flange 32. This heat sink includes several segments generally designated 60, 60*a*, etc. Each of these segments includes a main body 62, and preferably an at least partially inwardly directed radial flange 64 which tightly engages the axial flange 32 on the body 12. This massive section of copper readily bleeds the heat from the bead 18, preventing heat from reaching the mounting ring 42. Referring now to FIG. 7, there is shown in association with the lower portion 16 of the body 12 a lower heat sink generally designated 66. This sink 66 is shown to comprise segmented sections 68, 68*a*, 68*b* and 68*c*, which are slightly spaced apart in their position snugly engaging the lower threaded portion 36 of the body in intimate heat exchange relation. The segmented construction shows that the heat sink 66 is preferably a collet member which is somewhat reduced in diameter when inserted into the passage 34, but which then can be expanded into tight contact with (and hence intimate heat exchange relation with) the inner diameter of the passage 34.

Finally, there is a centrally disposed tube 70 which as a further option, may blow the cooling air, which is heavily moistened with water, into the space 74 above just below the rupture disk 40 and in contact with the ring isolating member 50. With both of these heat sink devices in place, the heat is preferentially absorbed by them and thus the isolating member 50, which has a much thinner cross section, transfers even less heat to the mounting ring 42 then would be the case without it. The use or non-use of the heat sink may be dictated by whether the joint is to be formed by brazing or welding, since there is higher temperature involved in welding, for example. The flow of the moistened air is shown by the arrows in FIG. 6.

Referring now to the preferred materials from the which the improved rupture disk of the invention is made, the rupture disk itself is ordinarily made from nickel having a thickness of 0.005" to 0.007", for example. The rupture disk may be of a different thickness, and if so it may include lines of weakness in various patterns formed by scoring or the like. This nickel member 40 is welded or brazed onto the mounting ring as shown. The mounting ring, the isolating ring, the washer and the remainder of the body are all made from a 300 series stainless steel material. The washer is preferably made from thin stock, say 0.040" or similar. The elements of the upper and lower heat sink are made from copper, which is acknowledged to be an outstanding conductor of heat. The threads of the body are pipe thread, that is tapered threads, preferably NPT thread, but other types of threads and methods of sealing the joints between the rupture disk assembly and mating piping are possible.

In describing the invention, it will be noted that the description refers to upper and lower body portions. This is the preferred method, but it will be understood that, in use, parts may be inverted, or in manufacturing, parts may be intermixed such that the lower part is the outside part and the upper part is the inside part. The rupture disk is shown as being convex toward the pressure side, but conceivably it could be arranged in another way. Other changes will occur to those skilled in the art. Likewise, the flanges are the remnants of flats or faces formed in the cylindrical upper body portion, for example.

It will thus be seen that the present invention provides a rupture disk assembly having a number of advantages and characteristics including those expressly point out here, and others which are inherent in the invention. Several illustrative embodiments of the product of the invention having been shown and described, it is anticipated that variations to the described form of apparatus will occur to those skilled in the art and that such modifications and changes may be made without departing from the spirit of the invention, or the scope of the appended claims.

What is claimed is:

1. A rupture disk assembly comprising, in combination, a two-piece body portion, said two-pieces comprising a lower body portion including a passage for pressurized gas or liquid, a portion for attachment to a high-pressure source, a ring isolating portion joined at one end to one portion of said lower body portion, a mounting ring portion joined to said ring isolating portion and having a substantially greater thickness in radial cross section than said ring isolating portion, a rupture disk joined to the end of said mounting ring portion opposite where said ring isolating portion joins said mounting ring portion, a washer covering said rupture disk along an outer margin of said rupture disk, a joint formed by welding or brazing and joining said rupture disk, said washer and said mounting ring portion together, a portion of said lower body extending radially outwardly from a portion of said body just beneath said ring isolating portion to a point at least outboard of said mounting ring portion, and an upper body portion defining an outlet passage for liquid or gas released when said rupture disk fractures, means for attaching piping leading to a region of safe discharge, at least one axial portion of said upper body portion closely overlying said lower body portion and being permanently attached thereto by welding or brazing, said rupture disk being thereby isolated from mechanical or thermal strains arising in passages of said two-piece body portion.

2. A rupture disk assembly as defined in claim 1, wherein the overall radial dimension of said two-piece body portion is from about 0.5" to about 2".

3. A rupture disk assembly as defined in claim 2, wherein the radial thickness of said mounting ring is from about 0.125" to about 0.200".

4. A rupture disk assembly as defined in claim 2, wherein the radial thickness of said ring isolating member is from about 0.030" to about 0.120".

5. A rupture disk assembly as defined in claim 1, wherein said rupture disk has a thickness of from about 0.005" to from about 0.015".

6. A rupture disk assembly as defined in claim 1, wherein said rupture disk is convex toward the pressure side of said rupture disk assembly.

7. A rupture disk assembly as defined in claim 1, wherein said rupture disk is made from nickel.

8. A rupture disk assembly as defined in claim 1, wherein said upper and lower body portions are made from the same material.

9. A rupture disk assembly as defined in claim 8, wherein said material is stainless steel.

* * * * *